(12) United States Patent
Ganesan et al.

(10) Patent No.: US 7,672,739 B2
(45) Date of Patent: Mar. 2, 2010

(54) SYSTEM FOR MULTIRESOLUTION ANALYSIS ASSISTED REINFORCEMENT LEARNING APPROACH TO RUN-BY-RUN CONTROL

(75) Inventors: Rajesh Ganesan, Centreville, VA (US);
Tapas K. Das, Tampa, FL (US);
Kandethody M. Ramachandran, Tampa, FL (US)

(73) Assignee: University of South Florida, Tampa, FL (US)

( * ) Notice: Subject to any disclaimer, the term of this patent is extended or adjusted under 35 U.S.C. 154(b) by 128 days.

(21) Appl. No.: 11/464,107

(22) Filed: Aug. 11, 2006

(65) Prior Publication Data

US 2007/0260346 A1     Nov. 8, 2007

Related U.S. Application Data

(60) Provisional application No. 60/707,243, filed on Aug. 11, 2005.

(51) Int. Cl.
*G05B 13/02* (2006.01)
(52) U.S. Cl. .............................. 700/29; 700/42; 700/78
(58) Field of Classification Search .................. 700/28, 700/29, 42, 52–54, 108, 34, 44, 55, 78
See application file for complete search history.

(56) References Cited

U.S. PATENT DOCUMENTS

| | | | | |
|---|---|---|---|---|
| 5,495,554 | A * | 2/1996 | Edwards et al. | 702/197 |
| 5,568,378 | A * | 10/1996 | Wojsznis | 700/44 |
| 5,875,122 | A * | 2/1999 | Acharya | 708/407 |
| 6,207,936 | B1 * | 3/2001 | de Waard et al. | 700/30 |
| 6,480,750 | B2 * | 11/2002 | Junk | 700/34 |
| 6,882,992 | B1 * | 4/2005 | Werbos | 706/48 |
| 7,149,591 | B2 * | 12/2006 | Gao et al. | 700/78 |
| 7,317,953 | B2 * | 1/2008 | Wojsznis et al. | 700/28 |
| 7,519,488 | B2 * | 4/2009 | Fu et al. | 702/69 |
| 2005/0075740 | A1 * | 4/2005 | Gao et al. | 700/78 |

OTHER PUBLICATIONS

E. Del Castillo and A. M. Hurwitz, "Run-to-run process control: Literature review and extensions," Journal of Quality Technology, vol. 29, No. 2, pp. 184-196, 1997.

(Continued)

*Primary Examiner*—Charles R Kasenge
(74) *Attorney, Agent, or Firm*—Courtney M. Dunn; Smith & Hopen, P.A.

(57) ABSTRACT

A new multiresolution analysis (wavelet) assisted reinforcement learning (RL) based control strategy that can effectively deal with both multiscale disturbances in processes and the lack of process models. The application of wavelet aided RL based controller represents a paradigm shift in the control of large scale stochastic dynamic systems of which the control problem is a subset. The control strategy is termed a WRL-RbR controller. The WRL-RbR controller is tested on a multiple-input-multiple-output (MIMO) Chemical Mechanical Planarization (CMP) process of wafer fabrication for which process model is available. Results show that the RL controller outperforms EWMA based controllers for low autocorrelation. The new controller also performs quite well for strongly autocorrelated processes for which the EWMA controllers are known to fail. Convergence analysis of the new breed of WRL-RbR controller is presented. Further enhancement of the controller to deal with model free processes and for inputs coming from spatially distributed environments are also addressed.

2 Claims, 9 Drawing Sheets

OTHER PUBLICATIONS

T. H. Smith and D. S. Boning, "Artificial neural network exponentially weighted moving average control for semiconductor processes," J. Vac. Sci. Technol. A, vol. 15, No. 3, pp. 1377-1384, 1997.

E. Del Castillo and R. Rajagopal, "A multivariate double ewma process adjustment scheme for drifting processes," IIE Transcations, vol. 34, No. 12, pp. 1055-1068, 2002.

R. Rajagopal and B. Del Castillo, An analysis and mimo extension of a double ewma run-to-run controller for non-squared systems:' International Journal of Reliability, Quality and Safety Engineering, vol. 10, No. 4, pp. 417-428, 2003.

E. Del Castillo, "Long run transient analysis of a double EWMA feedback controller," IIE Transactions, vol. 31, pp. 1157-1169, 1999.

V. S. Borkar, "Stochastic approximation with two-time scales," System and Control Lette,s, vol. 29, pp. 291-294, 1997.

A. Gosavi, "European journal of operational research," Reinforcement Learning for Long-Run Average Cost, vol. 155, pp. 654-674, 2004.

* cited by examiner

SYSTEM FOR MULTIRESOLUTION ANALYSIS ASSISTED REINFORCEMENT LEARNING APPROACH TO RUN-BY-RUN CONTROL

CROSS REFERENCE TO RELATED APPLICATIONS

This application claims priority to currently pending U.S. Provisional Patent Application 60/707,243, entitled, "A Machine Learning Approach to Run by Run Control Using Wavelet Modulated Sensor Data", filed Aug. 11, 2005, the contents of which are herein incorporated by reference.

STATEMENT OF GOVERNMENT INTEREST

This invention was made with government support under grant No. DM10330145 awarded by the National Science Foundation. The government has certain rights in the invention.

FIELD OF INVENTION

This invention relates to controllers for manufacturing processes. More specifically, this invention relates to a system for multiresolution analysis assisted reinforcement learning approach to run-by-run control.

BACKGROUND OF THE INVENTION

In recent years, run-by run (RbR) control mechanism has emerged as an useful tool for keeping complex semiconductor manufacturing processes on target during repeated short production runs. Many types of RbR controllers exist in the literature of which the exponentially weighted moving average (EWMA) controller is widely used in the industry. However, EWMA controllers are known to have several limitations. For example, in the presence of multiscale disturbances and lack of accurate process models, the performance of EWMA controller deteriorates and often fails to control the process. Also control of complex manufacturing processes requires sensing of multiple parameters that may be spatially distributed. New control strategies that can successfully use spatially distributed sensor data are required.

Run-by-Run (RbR) process control is a combination of Statistical Process Control (SPC) and Engineering Process Control (EPC). The set points of the automatic PID controllers, which control a process during a run, generally change from one run to the other to account for process disturbances. RbR controllers perform the critical function of obtaining the set point for each new run. The design of a RbR control system primarily consists of two steps—process modeling, and online model tuning and control. Process modeling is done offline using techniques like response surface methods and ordinary least squares estimation. Online model tuning and control is achieved by the combination of offset prediction using a filter, and recipe generation based on a process model (control law). This approach to RbR process control has many limitations that need to be addressed in order to increase its viability to distributed sensing environments. For example, many process controllers rely on good process models that are seldom available for large scale nonlinear systems made up of many interacting subsystems. Even when good (often complex) models are available, the issue becomes the speed of execution of the control algorithms during online applications, which ultimately forces model simplification and resultant suboptimal control. Also the processes are often plagued with multiscale (multiple freq.) noise, which, if not precisely removed, leads to serious lack of controller efficiency.

SUMMARY OF INVENTION

A new multiresolution analysis (wavelet) assisted reinforcement learning (RL) based control strategy that can effectively deal with both multiscale disturbances in processes and the lack of process models. The application of wavelet aided RL based controller represents a paradigm shift in the control of large scale stochastic dynamic systems of which the control problem is a subset. The control strategy is termed a WRL-RbR controller. The WRL-RbR controller is tested on a multiple-input-multiple-output (MIMO) Chemical Mechanical Planarization (CMP) process of wafer fabrication for which process model is available. Results show that the RL controller outperforms EWMA based controllers for low autocorrelation. The new controller also performs quite well for strongly autocorrelated processes for which the EWMA controllers are known to fail. Convergence analysis of the new breed of WRL-RbR controller is presented. Further enhancement of the controller to deal with model free processes and for inputs coming from spatially distributed environments are also addressed.

The limitations of prior art controllers can be addressed through a multiresolution analysis (wavelet) assisted learning based controller, which is built on strong mathematical foundations of wavelet analysis and approximate dynamic programming (ADP), and is an excellent way to obtain optimal or near-optimal control of many complex systems. This wavelet intertwined learning approach has certain unique advantages. One of the advantages is their flexibility in choosing optimal or near-optimal control action from a large action space. Other advantages include faster convergence of the expected value of the process on to target, and lower variance of the process outputs. Moreover, unlike traditional process controllers, they are capable of performing in the absence of process models and are thus suitable for large scale systems.

This work was motivated by the need to develop an intelligent and efficient RbR process controller, especially for the control of processes with short production runs as in the case of semiconductor manufacturing industry. A controller that is presented here is capable of generating optimal control actions in the presence of multiple time-frequency disturbances, and allows the use of realistic (often complex) process models without sacrificing robustness and speed of execution. Performance measures such as reduction of variability in process output and control recipe, minimization of initial bias, and ability to control processes with high auto-correlations are shown to be superior in comparison to the commercially available EWMA controllers. The WRL-RbR controller is very generic, and can be easily extended to processes with drifts and sudden shifts in the mean and variance. The viability of extending the controller to distributed input parameter sensing environments including those for which process models are not available is also addressed.

According to one aspect of the present invention there is provided a run-by-run controller for controlling output variability in a manufacturing process run. The controller includes a wavelet modulator module to generate a wavelet reconstructed signal ($f_t$) from the process output ($y_t$) for a run t, a process model module to generate a predicted model output ($\hat{y}_t$) for a run t, an error predictor module to predict a forecast offset ($a_t$) using the input $E_t = f_t - \hat{y}_t$; and a recipe generator module to generate a control recipe ($u_{t+1}$) by applying the forecast offset ($a_t$), wherein the control recipe is passed to a PID controller as a set-point for the next run and to the process model module to predict the next process output at run t+1.

According to one aspect of the present invention there is provided a method of performing run-by-run control to control output variability in a manufacturing process run. The method includes the steps of generating a wavelet reconstructed signal ($f_t$) from the process output ($y_t$) for a run t, generating a predicted model output ($\hat{y}_t$) for a run t using a control recipe ($u_t$), predicting a forecast offset ($a_t$) using the input $E_t = f_t - \hat{y}_t$, generating a control recipe ($u_{t+1}$) by applying the forecast offset ($a_t$), wherein the control recipe is passed to a PID controller set-point for the next run and to the process model module to predict the next process output at run t+1 and passing the control recipe ($u_{t+1}$) to a PID controller as a set-point for the next run and to the process model module to predict the next process output at run t+1. In certain aspects of the present invention the manufacturing process is a MIMO process. In yet other aspect of the present invention the manufacturing process is a SISO process.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
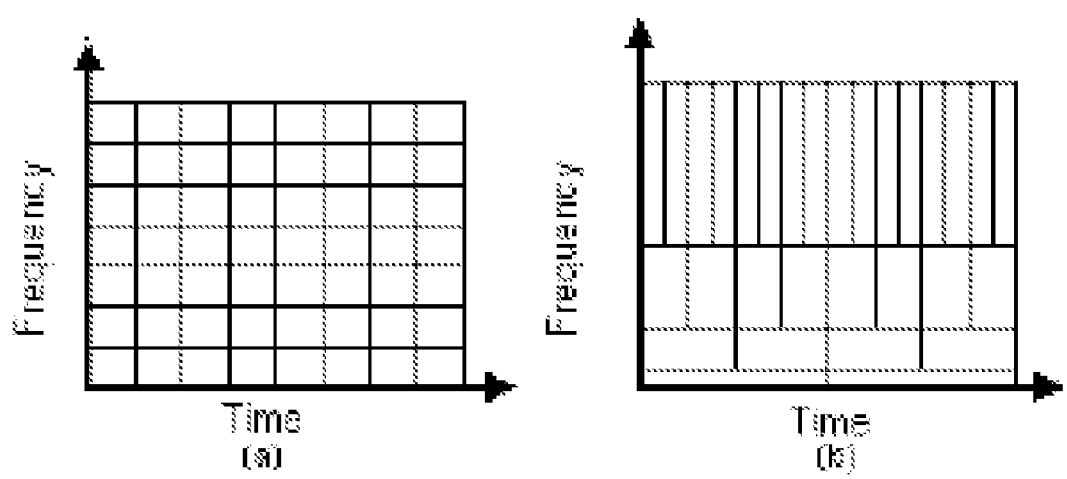
FIG. 1 is an illustration of representations of denoising techniques. (a) Short time Fourier transform (STFT) with fixed aspect ratio. (b) Wavelet Transform with variable aspect ratio.

A new multiresolution analysis (wavelet) assisted reinforcement learning (RL) based control strategy that can effectively deal with both multiscale disturbances in processes and the lack of process models. The application of wavelet aided RL based controller represents a paradigm shift in the control of large scale stochastic dynamic systems of which the control problem is a subset. The control strategy is termed a WRL-RbR controller. The WRL-RbR controller is tested on a multiple-input-multiple-output (MIMO) Chemical Mechanical Planarization (CMP) process of wafer fabrication for which process model is available. Results show that the RL controller outperforms EWMA based controllers for low autocorrelation. The new controller also performs quite well for strongly autocorrelated processes for which the EWMA controllers are known to fail. Convergence analysis of the new breed of WRL-RbR controller is presented. Further enhancement of the controller to deal with model free processes and for inputs coming from spatially distributed environments are also addressed.

Among the process control literature for stochastic systems with short production runs, a commonly used control is the RbR controller. Some of the major RbR algorithms include EWMA control [1], which is a minimum variance controller for linear and autoregressive processes, optimizing adaptive quality control (OAQC) [2] which uses Kalman filtering, and model predictive R2R control (MPR2RC) [3] in which the control action is based on minimizing an objective function such as mean square deviation from target. Comparative studies between the above types of controllers indicate that in the absence of measurement time delays, EWMA, OAQC and MPR2RC algorithms perform nearly identically [4] and [5]. Also, among the above controllers, the EWMA controller has been most extensively researched and widely used to perform RbR control [6], [7], [8], [9], [10], [11], [12], [13], [14], [15], [16], and [17].

Consider a SISO process $$y_t = \gamma + \eta u_t + \text{noise}, \quad (1)$$

where t is the index denoting the run number, $y_t$ is the process output after run t, $\gamma$ denotes the offset, $\eta$ represents the gain, and $u_t$ represents the input before run t. To account for process dynamics, the RbR controllers assume that the intercept $\gamma$ varies with time [1]. This is incorporated by considering the prediction model for the process to be $$\hat{y}_t = a_{t-1} + bu_t = T, \quad (2)$$

for which the corresponding control action is given by $$u_t = \frac{T - a_{t-1}}{b}, \quad (3)$$

where $a_{t-1}$ is considered to be the one step ahead prediction of the process offset $\gamma$, i.e., $a_{t-1} = \gamma_t$. The estimated value b of the process gain $\eta$ is obtained offline. It is considered that $E(b) = \eta$, which implies that it is an unbiased estimate. The model offset after run t, $a_t$, is updated by the EWMA method as $$a_t = \lambda(y_t - bu_{t-1}) + (1-\lambda)a_{t-1}. \quad (4)$$

Some of the primary drawbacks of controllers listed above include (1) dependence on good process models, (2) control actions limited by fixed filtering parameters as in EWMA, (3) inability to handle large perturbations of the system, (4) dependence on multiple filtering steps to compensate for drifts and autocorrelation, (5) inability to deal with the presence of multiscale noise, and (6) inability to scale up to large real world systems.

A control strategy is basically the prediction of forecast offset $a_t$, which in turn decides the value of the recipe $u_{t+1}$ as per the predicted model (2). Hence, the performance of a control strategy greatly depends on its ability to accurately predict $a_t$. At every step of the RbR control, the number of possible choices for forecast offset at could be infinite. The key is to develop a strategy for predicting the best value of at for the given process output. The accuracy of the prediction process in conventional controllers such as the EWMA suffers from two aspects. These include 1) multiscale noises that mask the true process deviations, which are used in the prediction process, and 2) the use of a fixed filtering strategy as given by (4) limits the action choices. A wavelet interfaced machine learning based approach for predicting $a_t$ could provide the ability to extract the true process, and thus predict the correct offset, and also evaluate a wide range of control choices in order to adopt the best one as explained below.

In most real world applications, inherent process variations, instead of being white noise with single scale (frequency), are often multiscale with different features localized in time and frequency. Thus, the true process outputs $y_t$ could be masked by the presence of these multiscale noises. Some examples of multiscale noise include vibrations and other disturbances captured by the sensors, noise added by the sensing circuit, measurement noise, and radio-frequency interference noise. It is beneficial if a controller could be presented with a true process output with only its significant features and without the multiscale noise. This could be accomplished through denoising of multiscale noise via a wavelet based multiresolution thresholding approach. The wavelet methods provide excellent time-frequency localized information, i.e. they analyze time and frequency localized features of the sensor data simultaneously with high resolution. They also posses the unique capability of representing long signals in relatively few wavelet coefficients (data compression). The wavelet based multiresolution approach has the ability to eliminate noise from the process output signal while retaining significant process features arising from disturbances such as trends, shifts, and autocorrelation [18]. Other denoising techniques such as short time Fourier transform (STFT) and other time or frequency only based approaches are known to be inferior to the wavelet based approach in dealing with multiscale signals due to following reasons. The conventional time domain analysis methods, which are sensitive to impulsive oscillations, have limited utility in extracting hidden patterns and frequency related information in these signals [19] and [20]. This problem is partially overcome by spectral (frequency) analysis such as Fourier transform, the power spectral density, and the coherence function analysis. However, many spectral methods rely on the implicit fundamental assumption of signals being periodic and stationary, and are also inefficient in extracting time related features. This problem has been addressed to a large extent through the use of time-frequency based STFT methods. However, this method uses a fixed tiling scheme, i.e., it maintains a constant aspect ratio (the width of the time window to the width of the frequency band) throughout the analysis (FIG. 1a). As a result, one must choose multiple window widths to analyze different data features localized in time and frequency domains in order to determine the suitable width of the time window. STFT is also inefficient in resolving short time phenomena associated with high frequencies since it has a limited choice of wave forms [21]. In recent years, another time-frequency (or time-scale) method known as wavelet based multiresolution analysis have gained popularity in the analysis of both stationary and nonstationary signals. These methods provide excellent time-frequency localized information, which is achieved by varying the aspect ratio as shown in FIG. 1b. This means that multiple frequency bands can be analyzed simultaneously in the form of details and approximations plotted over time, as described in the next section. Hence, different time and frequency localized features are revealed simultaneously with high resolution. This scheme is more adaptable (compared to STFT) to signals with short time features occurring at higher frequencies.

Though an exact mathematical analysis of the effects of multiscale noise on performance of EWMA controllers is not available, some experimental studies conducted by us show that EWMA controllers attempt to compensate for multiscale noise through higher variations of the control recipe ($u_t$). However, this in turn results in higher variations of the process output. It is also noted that, if the expected value of the process is on target and the process is subjected to variations, for which there are no assignable causes, the controller need not compensate for such variations, and hence the recipe should remain constant. In fact, an attempt to compensate for such variations from chance causes (noise) not only increases the variations of $u_t$ but also increases the variations of the process output $y_t$. A controller is maintained in place in anticipation of disturbances, such as mean and variance shift, trend, and autocorrelation, resulting from assignable causes. As a result, in the absence of disturbances, controllers continue to unduly compensate for process dynamics due to noise. Also EWMA is a static control strategy where the control is guided by the chosen λ value as shown in (4). Thus EWMA controllers do not offer the flexibility of a having a wide variety of control choices. The above difficulties can be well addressed by a learning based intelligent control approach. Such an approach is developed in this research and is presented next.

A new control strategy is thus presented, named wavelet modulated reinforcement learning run by run control (WRL-RbR), that benefits from both wavelet based multiresolution denoising and reinforcement learning, as discussed above, and thus alleviates many of the shortcomings of EWMA controllers.

WRL-RbR: A WAVELET MODULATED REINFORCEMENT LEARNING CONTROL

Figure 2:
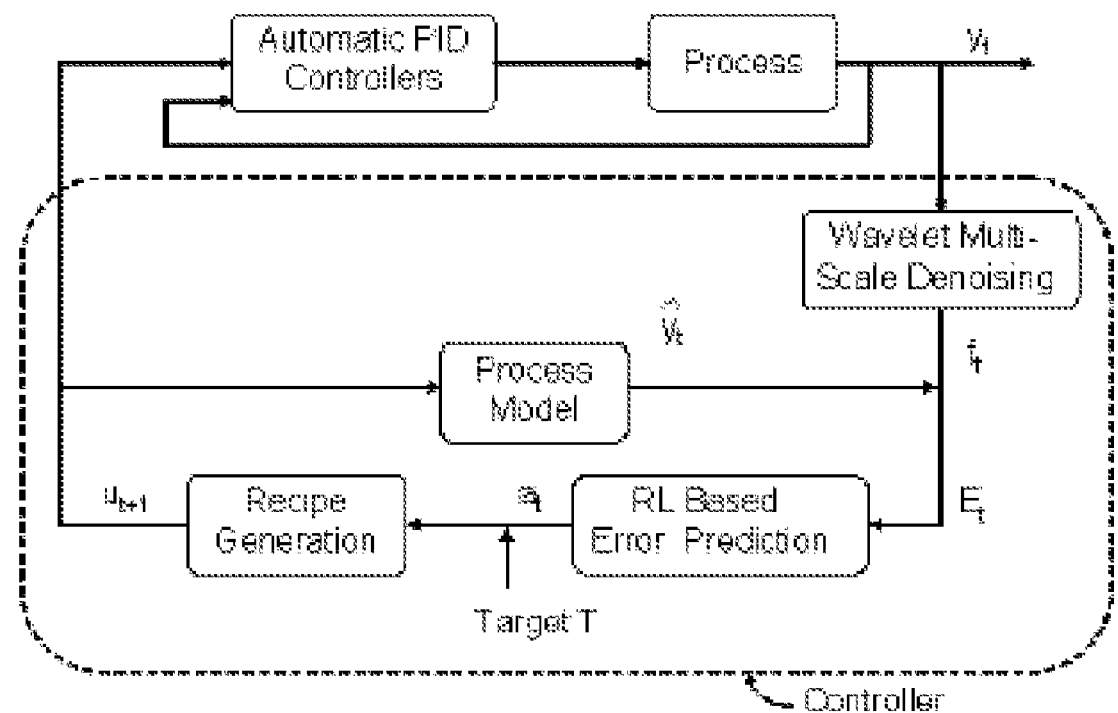
FIG. 2 is a schematic illustration of the structure of a WRL-RbR controller.

FIG. 2 shows a schematic of the WRL-RbR controller. The controller consists of four elements: the wavelet modulator, process model, error predictor, and recipe generator. The process output signal $y_t$ is first wavelet decomposed, thresholded and reconstructed to extract the significant features of the signal. As explained above, this step eliminates the multiscale stationary noise for which the controller need not compensate. The second step involves forecast offset at prediction which is accomplished via the RL based stochastic approximation scheme. The input to this step is $E_t = f_t - \hat{y}_t$, where $f_t$ is the wavelet reconstructed signal and $\hat{y}_t$ is the predicted model output for the run t. Finally, a control recipe $u_{t-1}$ is generated based on the forecast offset prediction, which is then passed on as set-point for the PID controller and also to the process model to predict the next process output at run t+1. In the following subsections, we describe each element of the WRL-RbR controller.

A. Wavelet Assisted Multiscale Denoising

The wavelet based multiscale denoising renders many advantages that a controller can benefit from. One of these advantages is the detection of deterministic trends in the original signal. This can be achieved by monitoring the slope information in the approximation coefficients of the decomposition step. This information on the trend can be used as additional information for the controller to develop trend compensation strategies. Another advantage of wavelet analysis is the protection it offers against sudden spikes in the original signal which can result in oscillations in the control.

Conceptually, multiscale denoising can be explained using the analogy of nonparametric regression in which a signal $f_t$ is extracted from a noisy data $y_t$ as $$y_t = f_t + \text{noise}_1, \qquad (5)$$

where $\text{noise}_1$ is the noise removed by the wavelet analysis procedure described below. The wavelet analysis consists of three steps: 1) decomposition of the signal using orthogonal wavelets into wavelet coefficients, 2) thresholding of the wavelet coefficients, and 3) reconstruction of the signal into the time domain. The basic idea behind signal decomposition with wavelets is that the signal can be separated into its constituent elements through fast wavelet transform (FWT). A more detailed theory on multiresolution analysis can be found in [22]. In our method we used Daubechies [23] $4^{th}$ order wavelet basis function. Our choice of the basis function was motivated by the following properties: 1) It has orthogonal basis with a compact support. 2) The coefficients of the basis function add up to the square root of 2, and their sum of squares is unity; this property is critical for perfect reconstruction. 3) The coefficients are orthogonal to their double shifts. 4) The frequency responses has a double zero (produces 2 vanishing moments) at the highest frequency $\omega=\pi$, which provides maximum flatness. 5) With downsampling by 2, this basis function yields a halfband filter. It is to be noted that the choice of the basis function is dependent on the nature of the signal arising from a given application.

Thresholding of the wavelet coefficients $d_{j,k}$ (j is the scale and k is the translation index) help to extract the significant coefficients. This is accomplished by using the Donoho's threshold rule [24]. This threshold rule is also called visual shrink or 'VisuShrink' method, in which a universal scale-dependent threshold $t_j$ is proposed. The significant wavelet coefficients that fall outside of the threshold limits are then extracted by applying either soft or hard thresholding. WRL-RbR controller developed here uses soft thresholding. It is important to select the number of levels of decomposition and the thresholding values in such as way that excessive smoothing of the features of the original signal is prevented. A good review of various thresholding methods and a guideline for choosing the best method is available in [25] and [26]. Reconstruction of the signal in the time domain from the thresholded wavelet coefficients is achieved through inverse wavelet transforms. The reconstructed signal is denoted as $f_t$.

B. Process Model

Process models relate the controllable inputs $u_t$ to the quality characteristic of interest $\hat{y}_t$. Primarily, the prediction models are obtained from offline analysis through least squares regression, response surface methods, or through a design of experiments method. It is to be noted that, real world systems requiring distributed sensing are often complex and have large number of response and input variables. Models of such systems are highly non-linear. However, in practice complex non-linear models are not used in actual process control. This is because complex models often lack speed of execution during on-line model evaluation, and also introduce additional measurement delays since many of the response factors can only be measured off-line. This retards the feedback needed in generating control recipes for the next run. In essence, execution speed is emphasized over model accuracy, which promotes the use of simplified linear models [27]. The WRL-RbR strategy allows the use of more accurate complex models. This is because the control strategy is developed offline and hence requires no online model evaluation during its application.

C. RL Based Error Prediction

A machine learning approach can be used for the task of offset ($a_t$) prediction. The evolution of error $E_t=f_t-\hat{y}_t$, (a random variable) during the process runs is modeled as a Markov chain. The decision to predict the process offset at after each process run based on the error process $E_t$ is modeled as a Markov decision process (MDP). For the purpose of solving the MDP, it is necessary to discretize $E_t$ and $a_t$. Due to the large number of state and action combinations tuple ($E_t$, $a_t$), the Markov decision model is solved using a machine learning (reinforcement learning, in particular) approach. We first present a formal description of the MDP model and then discuss the RL approach to solve the model.

1) MDP Model of the RbR Control: Assume that all random variables and processes are defined on the probability space ($\Omega$, F, P). The system state at the end of the $t^{th}$ run is defined as the difference between the process output and the model predicted output ($E_t=f_t-\hat{y}_t$). Let E={E:t=0, 1, 2, 3 ... } be the system state process. Since, it can be easily argued that $E_{t+1}$ is dependent only on $E_t$, the random process E is a Markov chain.

Since the state transitions are guided by a decision process, where a decision maker selects an action (offset) from a finite set of actions at the end of each run, the combined system state process and the decision process becomes a Markov decision process. The transition probability in a MDP can be represented as p(x, d, q), for transition from state x to state q under action d. Let $\epsilon$ denote the system state space, i.e., the set of all possible values of $E_t$. Then the control system can be stated as follows. For any given x element $\epsilon$ at run t, there is an action selected such that the expected value of the process $y_{t+1}$ at run t+1 is maintained at target T. In the context of RbR control, the action at run t is to predict the offset $a_t$ which is then used to obtain the value of recipe $u_{t+1}$. Theoretically, the action space for the predicted offset could range from a large negative number to a large positive number. However, in practice, for a non-diverging process, the action space is quite small, which can be discretized to a finite number of actions. We denote the action space as A. Several measures of performance such as discounted reward, average reward, and total reward can be used to solve a MDP. Reward is defined r(x, d, q) for taking action d in state x at any run t+1 that results in a transition to state q, as the actual error $E_{t+1}=f_{t+1}-\hat{y}_{t+1}$ resulting from the action. Since the objective of the MDP is to develop an action strategy that minimizes the actual error, an average reward is adopted as the measure of performance. In the next subsection, the specifics of the offset prediction methodology using a RL based stochastic approximation scheme is provided.

2) Reinforcement Learning: RL is a simulation-based method for solving MDPs, which is rooted in the Bellman [28] equation, and uses the principle of stochastic approximation (e.g. Robbins-Monro method [29]). Bellman's optimality equation for average reward says that there exists a $\rho^*$ and R* that satisfies the following equation:

$$R^*(x) = \min_{d \in A} \left[ r(x, d) - \rho^* + \sum_{q \in \varepsilon} p(x, d, q) R^*(q) \right] \quad (6)$$

where $\rho^*$ is the optimal gain and R* is the optimal bias. The gain $\rho$ and bias R are defined as follows:

$$\rho = \lim_{N \to \infty} \frac{1}{N} E \left\{ \sum_{t=1}^{N} r(X_t) \right\} \quad (7)$$

$$R = E \left\{ \sum_{t=1}^{\infty} [r(X_t) - \rho] \right\} \quad (8)$$

where N is the total number of transition periods, and $X_t$=1, 2, 3, . . . is the Markov Chain. From the above definitions it follows that the gain represents the long run average reward per period for a system and is also referred as the stationary reward. Bias is interpreted as the expected total difference between the reward r and the stationary reward ρ.

The above optimality equation can be solved using the relative value iteration (RVI) algorithm as given in [30]. However, the RVI needs the transition probabilities p(x, d, q), which are often, for real life problems, impossible to obtain. An alternative to RVI is asynchronous updating of the R-values through Robbins-Monro (RM) stochastic approximation approach, in which the expected value component $\Sigma_{q\ element\ \epsilon}\ p(x, d, q)R^*(q)$ in (6) can be replaced by a sample value of R(q) obtained through simulation. The WRL-RbR algorithm is a two-time scale version of the above learning based stochastic approximation scheme, which learns p and uses it to learn $R^*(x, d)$ for all x an element of $\epsilon$ and d an element of A. Convergent average reward RL algorithms (R-learning) can be found in [31], and [32]. The strategy adopted in R-Learning is to obtain the R-values, one for each state-action pair. After the learning is complete, the action with the highest (for maximization) or lowest (for minimization) R-value for a state constitutes the optimal action. Particularly in control problems, reinforcement learning has significant advantages as follows: 1) it can learn arbitrary objective functions, 2) there is no requirement to provide training examples, 3) they are more robust for naturally distributed system because multiple RL agents can be made to work together toward a common objective, 4) it can deal with the 'curse of modeling' in complex systems by using simulation models instead of exact analytical models that are often difficult to obtain, and 5) can incorporate function approximation techniques in order to further alleviate the 'curse of dimensionality' issues.

The Bellman's equation given in (6) can be rewritten in terms of values for every state-action combination as follows. At the end of the $t^{th}$ run (decision epoch) the system state is Et=x an element of $\epsilon$. Bellman's theory of stochastic dynamic programming says that the optimal values for each state-action pair (x, d) can be obtained by solving the average reward optimality equation $$R^*(x, d) = \left[\sum_{q \in \varepsilon} p(x, d, q)r(x, d, q)\right] - \rho^* + \left[\sum_{j \in \varepsilon} p(x, d, j)\min_{d \in A} R^*(j, d)\right] \forall x, \forall d. \quad (9)$$

A two-time scale version of the learning based approach that we have adopted to solve the optimal values for each state-action combination $R^*(x, d)$ is as follows.

$$R_{t+1}(x, d) \leftarrow (1 - \alpha_t)R_t(x, d) + \alpha_t\left[r(x, d, q) - \rho_t + \min_{b \in A} R_t(q, b)\right] \forall x, \forall d, \quad (10)$$

$$\rho_{t+1} = (1 - \beta_t)\rho_t + \beta_t\left[\frac{\rho_t T_t + r(x, d, q)}{T_{t+1}}\right]. \quad (11)$$

In the above equations, t denotes the step index in the learning process (run number in the context of control), $\alpha_t$ and $\beta_t$ are learning parameters, which take values (0, 1), and $T_t$ is the cumulative time till the $t^{th}$ learning step.

The learning parameters $\alpha_t$ and $\beta_t$ are both decayed by the following rule.

$$\alpha_t \beta_t = \frac{\alpha_0, \beta_0}{1 + z}, z = \frac{t^2}{K + t}, \quad (12)$$

where K is a very large number. The learning process is continued until the absolute difference between successive R(x, d) for every state-action combination is below a predetermined small number $\epsilon > 0$, $$|R_{t+1}(x,d) - R_t(x,d)| < \epsilon, \forall x. \quad (13)$$

At the beginning of the learning process, the R-values are initialized to zeros. When the process enters a state for the first time, the action is chosen randomly since the R-values for all actions are zero initially. In order to allow for effective learning in the early learning stages, instead of the greedy action the decision maker with probability $P_t$ chooses from other actions. The choice among the other actions is made by generating a random number from a uniform distribution. The above procedure is commonly referred to in literature as exploration. The value of $p_t$ (called the exploration probability) is decayed faster than the learning parameters using equation (12). Storing of the R-values for each state-action combination often presents a computational challenge for large scale systems with numerous state-action combinations. One approach is to represent the R-values of subsets of state-action space as functions instead of storing R-values for each individual state-action combination, a method known as function approximation. Recently, a diffusion wavelet based function approximation scheme has been presented to the literature [33], [34], and [35].

D. Recipe Generation

Once learning is completed, the R-values provide the optimal action choice for each state. At any run t, as the process enters a state, the action d corresponding to the lowest non-zero absolute R-value indicates the predicted forecast offset $a_t$. This is used in the calculation of the recipe $u_{t+1}$. In what follows we present the steps of the WRL-RbR algorithm in the implementation phase.

V. WRL-RbR Algorithm

Step 1: The process is started at time t=0 with the assumption that the predicted offset $a_o$=0. The recipe for the first run is obtained from the control law given by (3).

Figure 3:
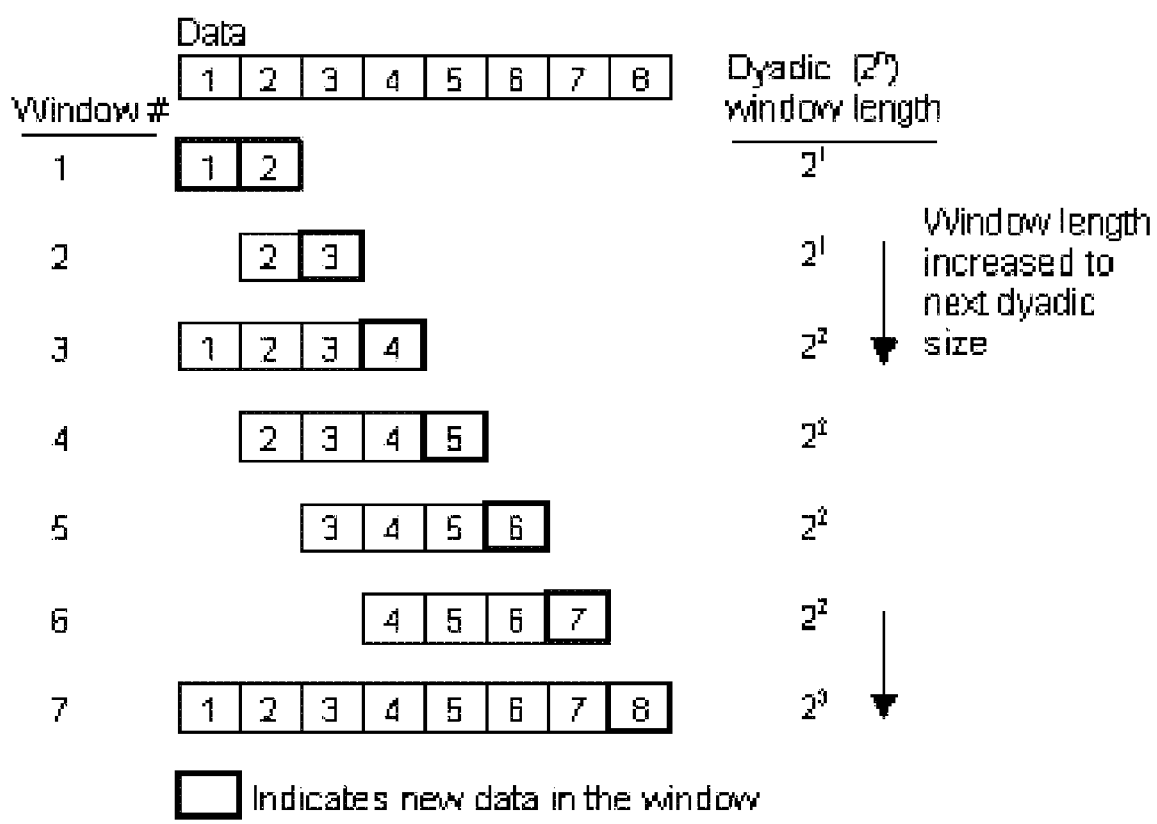
FIG. 3 is an illustration of a moving window concept.

Step 2: At the end of first run at t=1, the output $y_1$ is measured and the algorithm proceeds to Step 3. However, for time t≧2 wavelet decomposition is performed using a moving window concept as presented in [36]. Wavelet decomposition is done for the data in the window and the resulting wavelet coefficients at each scale are soft thresholded. Next, the signal in time domain is reconstructed from the thresholded wavelet coefficients. The decomposition strategy works as follows. As shown in FIG. 3, the first window will contain only 2 data points $y_1$ and $y_2$. At time t=3, the window is moved to include the next data point. However, the first data point of the window is dropped to maintain a dyadic window length ($2^k$), where k=1. Wavelet decomposition, thresholding and reconstruction is done for the data in the new window and only the last reconstructed value of $f_t$ is used in the calculation of the process deviation $E_t$ in Step 3. This process of moving the window of a dyadic length ($2^k$), continues in every run until the total data length starting from the beginning reaches a length of ($2^{k+}$). At this time the window length is increased to ($2^{k+1}$) and wavelet analysis is performed. Upgrading of the window length is carried out until a desired length, depending on the required depth of decomposition, is reached. From this point on, the window length is kept constant. This method is called integer or uniform discretization [37].

Step 3: At any given run t+1, calculate process deviation $E_{t+1} = f_{t+1} - \hat{y}_{t+1}$.

Step 4: Learning Stage: Using $E_{t+1}$ identify the state x of the process. $E_{t+1}$ obtained in Step 3 represents both the state of the system at run t+1 and the immediate reward $r(E_t, a_t, E_{t+1})$ obtained by taking action $a_t$ in state $E_t$. The R-value for the state-action combination ($E_t$, $a_t$) is updated as follows.

$$R_{t+1}(E_t, a_t) \leftarrow (1-\alpha_t)R_t(E_t, a_t) + \quad (14)$$
$$\alpha_t \Big[ r(E_t, a_t, E_{t+1}) - \rho_t + \min_{b \in A} R_t(E_{t+1}, b) : b = \operatorname{argmin}_{c \in A}$$
$$\{|R_t(E_{t+1}, c)| : R_t(E_{t+1}, c) \neq 0\} \Big] \forall E_t, \forall a_t$$

$$\min_{b \in A} R_t(E_{t+1}, b) : b = \operatorname{argmin}_{c \in A} \{|R_t(E_{t+1}, c)| : \quad (15)$$
$$R_t(E_{t+1}, c) \neq 0\}$$

indicates that $a_t$ for any state $E_{t+1}$, the greedy action b for which the absolute non-zero R-value that is closest to zero should be chosen. The optimal average reward $\rho_{t+1}$ is updated as follows.

$$\rho_{t+1} = (1-\beta_t)\rho_t + \beta_t \left[ \frac{\rho_t T_t + r(E_t, a_t, E_{t+1})}{T_{t+1}} \right]. \quad (16)$$

Learnt Stage: Using $E_{t+1}$ identify the state x of the process. The forecast offset $a_t$ for this state is now obtained from the R-value matrix by choosing the action that corresponds to the minimum of the absolute non-zero R-value for that state.

Step 5: Obtain the control recipe $u_{t+1}$ using (3). Generate the process output for the next run t+1 and go to Step 2.

VI. Analysis for Convergence of the WRL-RBR Controller

In the interests of brevity, the complete proof of convergence of the RL scheme adopted for WRL-RbR is not presented here. The numerical results presented in Section VII provide additional evidence of the controller's convergence in terms of the boundedness of the process output and its expected value being on target. These conditions are necessary to ensure stability of the controller. In what follows, it is shown that the WRL-RbR algorithm converges, and yields R(x,d) cvalues that give optimal process control strategy. The optimal process control strategy ensures that the expected value of the process output $y_t$ coincide with the target T, and also that the $y_t$'s are bounded.

It is first shown that the approximation schemes in the algorithm use transformation that are of the form presented in [38] and track ordinary differential equations (ODEs). The ODE framework based on convergence analysis presented in [39] is then used to show the convergence of the WRL-RbR algorithm.

Define the transformations as follows.

$$(H_1(R_t))(x,d) = \sum_{q \in \varepsilon} p(x,d,q) \Big[ r(x,d,q) - \rho^* + \min_{b \in A} R_t(q,b) \Big] \quad (17)$$

$$(H_2(R_t))(x,d) = \Big[ r(x,d,q) - \rho^* + \min_{b \in A} R_t(q,b) \Big], \quad (18)$$

-continued $$F_1(\rho_t) = \sum_{q \in \varepsilon} p(x,d,q) \left[ \frac{\rho_t T_t + r(x,d,q)}{T_{t+1}} \right], \quad (19)$$

$$F_2(\rho_t) = \left[ \frac{\rho_t T_t + r(x,d,q)}{T_{t+1}} \right]. \quad (20)$$

Also define errors $\omega_1^t$ and $\omega_2^t$ as:

$$\omega_1^t = (H_2(R_t))(x,d) - (H_1(R_t))(x,d), \quad (21)$$

$$\omega_2^t = F_2(\rho_t) - F_1(\rho_t). \quad (22)$$

The first of the two-time scale approximation equation (10) can now be written as:

$$R_{t+1}(x,d) = R_t(x,d) + \alpha_t[h(R_t(x,d), \rho_t) + \omega_1^t], \quad (23)$$

where:

$$h(R_t) = H_1(R_t) - R_t. \quad (24)$$

As in [39], it can be shown that (23) yields an ODE of the form:

$$\frac{dR_t}{d\tau} = h(R_t, \rho). \quad (25)$$

In a similar manner as above, the second of the two-time scale approximation equation (11) can be written as:

$$\rho_{t+1} = \rho_t + \beta_t[g(\rho_t) + \omega_2^t,] \quad (26)$$

where $$g(\rho_t) = F_1(\rho_t) - \rho_t. \quad (27)$$

Once again it can be shown that (26) track the ODE:

$$\frac{d\rho_t}{d\tau} = g(\rho_t). \quad (28)$$

A. Assumptions

1) Assumption 1: The functions h and g, defined in (25) and (28), are Lipschitz continuous. This is true because the mappings ($H_1(R_t)$) and $F_1(\rho_t)$ are linear everywhere as can be see from (17) and (19).

2) Assumption 2: Each state-action pair is visited after a finite time interval. This assumption is satisfied by running simulation for an arbitrarily long period of time until the condition $|R_{t+1}(x,d) - R_t(x,d)| < \epsilon$ is ensured for every state-action pair that is visited. However, some remote state-action pairs are rarely visited or none at all even after substantial exploration. Such state-action pairs that are not visited too 'often do not impact quality of the decision.

3) Assumption 3: The step size $\alpha_t$ and $\beta_t$ are small, which can be ensured by appropriately selecting the parameter values. The nature of R-learning is such that the reward values are updated asynchronously (one state-action pair updated in each iteration of the learning process). In order to obtain convergence to the same reward values as in the case of synchronous algorithms (where rewards for all states are updated simultaneously, i.e., in dynamic programming using transition probabilities), it is necessary to maintain small values of learning parameters $\alpha_t$ and $\beta_t$. The $\alpha_t$ and $\beta_t$ values are chosen very small in order to allow slow learning and corresponding convergence. Large values of $\alpha_t$ and $\beta_t$ could cause R-values to oscillate and not converge.

4) Assumption 4: The learning parameters must satisfy the following condition:

$$\lim_{t \to \infty} \sup \frac{\beta_t}{\alpha_t} = 0. \tag{29}$$

The interpretation of this assumption is that the rate of decay for learning parameter fit is faster than $(a_t)$. This is achieved by fixing the starting values of both $\alpha_t$ and $\beta_t$ as 0.01 and 0.001 respectively (Section VII A). This assumption is very crucial for these schemes to work. It says that the second iteration (Equation 16) is much slower than the first (Equation 14) because of its smaller step-size. This implies that the fast iteration in R sees the slower iteration in $\rho$ as a constant and hence converges, while the slower iteration sees the faster iteration as having converged [38] and [40]. The limiting behavior of the slower iteration is given by the ODE in Assumption 8 while that of the faster one is given by that in Assumption 7. Assumptions 2, 3, and 4 place restrictions on the learning process.

5) Assumption 5: The iterates $R_t$ and $\rho_t$ are bounded. From the definition of the gain (7) it implies that the expected value of $r(\cdot)$ is also bounded. Since at any time t the expected reward $r(\cdot)=E_t=f_t-\hat{y}_t$ (see definition of $E_t$ in Section IV), it implies that the process output $y_t$ is bounded. This implies that both $R_t$ and $\rho_t$ are bounded.

6) Assumption 6: The expected value of the error terms in Equation (21) and (22) are 0 and their variances are bounded. This condition is satisfied because it can be seen from the definition of these terms that the error represents the difference between the sample and a conditional mean. By martingale convergence theory, the conditional mean tends to 0 as the number of samples tends to infinity. As per Assumption 5, iterates are bounded. This implies that the right side of (23) and (26) are bounded, which ensures that the variance of the error terms $\omega 1$ and $\omega 2$ are bounded.

7) Assumption 7. The ODE:

$$\frac{dR_t}{d\tau} = h(R_t, \rho) \quad \forall \rho \tag{30}$$

has an asymptotically stable critical point $G(\rho)$, which is unique such that the map G is Lipschitz continuous. This assumption is satisfied because of the following reason. For a fixed $\rho$, the mapping H1 (R) (17) is non-expansive with respect to the max norm [39]. Borkar and Soumyanath [40] show that for non-expansive mappings that does not need a contraction property, the above ODE converges to an asymptotically stable critical point $R_\rho$. The Lipschitz continuity of $R_\rho$ can be proved by the fact that the components of the R vector (8) are Lipschitz continuous in $\rho$ [41].

8) Assumption 8: The ODE:

$$\frac{d\rho_t}{d\tau} = g(\rho_t) \tag{31}$$

has a global asymptotically stable critical point $\rho^*$, which is unique. This is due to the fact that as the R-values stabilize, the policy becomes stationary. For a given stationary policy, the average reward is a finite constant and is also Lipschitz continuos [41]. Thus, the solution to the above ODE converges to the average reward, which is the global asymptotically stable critical point $\rho^*$.

In the case of the WRL-RbR controller, the long run average reward value $\rho^*$ converges to 0. This can be verified from the definition of the gain in (7) and the fact that $r(\cdot)=E_t=f_t-\hat{y}_t$. This implies that the expected value of $r(\cdot)=0$, since by definition, they are process deviations from target. The above convergence result of $\rho^*=0$ and Equation (2) together show that $E(y_t)$ converges to target T.

B. Optimality of the Control Policies

In the context of WRL-RbR controller, it is necessary to show that the control policy to which the algorithm converges is indeed optimal. To do this it is sufficient to show that the Rvalues converge to their optimal values. This is accomplished in two stages. First, for the MDP case, it is shown that the Bellman's transformation for value iteration and the relative value iteration (RVI) lead to the same policy. Since the value iteration has been demonstrated to yield optimal policies, it is concluded that the policies of the RVI are also optimal.

It is argued in [39] the approximations (23) and (26) converge to optimal values. Since this discussion on optimality is general and independent of the problem context, it is not reproduced here. The R-values obtained from (14) is the same as that obtained from (23). Thus, the WRL-RbR controller is optimal.

VII. Performance Analysis

The performance of WRL-RbR controller was tested on both SISO and MIMO processes. Processes with varying degrees of autocorrelation were studied as numerical examples. The results obtained from the WRL-RbR based strategies were compared with the EWMA based strategies.

A. WRL-RbR Controller Performance for a SISO Process

We consider an autocorrelated process as given in [8].

$$y_t = \phi y_{t-1} + \gamma + \eta u_t + N_t, \tag{32}$$

where $N_t = \omega N_{t-1} + \epsilon_t - c\epsilon_{t-1}$ is the ARMA(1,1) process for the error, and $\epsilon_t$ is white noise with $U(-1, 1)$ distribution. The autocorrelation parameters are $\phi$ for the process output, and c and $\omega$ for the noise. The initial process parameter values used are as follows: $\gamma=2.0$, $\eta=2.0$, $u_t=5.0$, $\omega=1.0$, $c=0.7$. This means that $N_t$ follows an IMA(1,1) process (i.e. an ARMA(1, 1) process with $\omega=1.0$). The output autocorrelation parameter $\phi$ was varied between 0.1 and 0.96. The smoothing constant for the EWMA equation ($\lambda$) was fixed at 0.1. This value of ($\lambda$) is the same as those used in [8] and [1]. The process target value was fixed at T=10. The above process with its parameters was simulated using MATLAB for 200 runs and 50 replications.

For the wavelet analysis, we chose Daubechies [23] $4^{th}$ order wavelet because of its well known stability properties [36]. Also, we chose a dyadic window length of sixteen, which allows up to four levels of decomposition. The number of levels was fixed based on the application at hand and the speed of execution of the online algorithm. The learning parameters $\alpha_0$ and $\beta_0$ and were initialized at 0.01 and 0.001, respectively. The exploration parameter was initialized at 0.5. The constant K in the decay equations for the learning parameters was maintained at $5 \times 10^8$ and for the exploration parameter was kept at $1 \times 10^6$. The error state space had 4001 states, each having a range of 0.1, starting at −200 until 200. The action space consisted of values from −5 to 15 in steps of 0.1. This resulted in 201 possible actions for each state.

The process was first simulated as is with no additional changes to either its mean or its variance. The R-values were learnt for all state and action combinations. Once learning was completed offline, the learnt phase was implemented online. The WRL-RbR and EWMA controllers were applied to assess their abilities in bringing the process from start to a stable operating condition. The mean square deviation (MSD) from target of the process under both control strategies were obtained for the first 200 runs.

Figure 4:
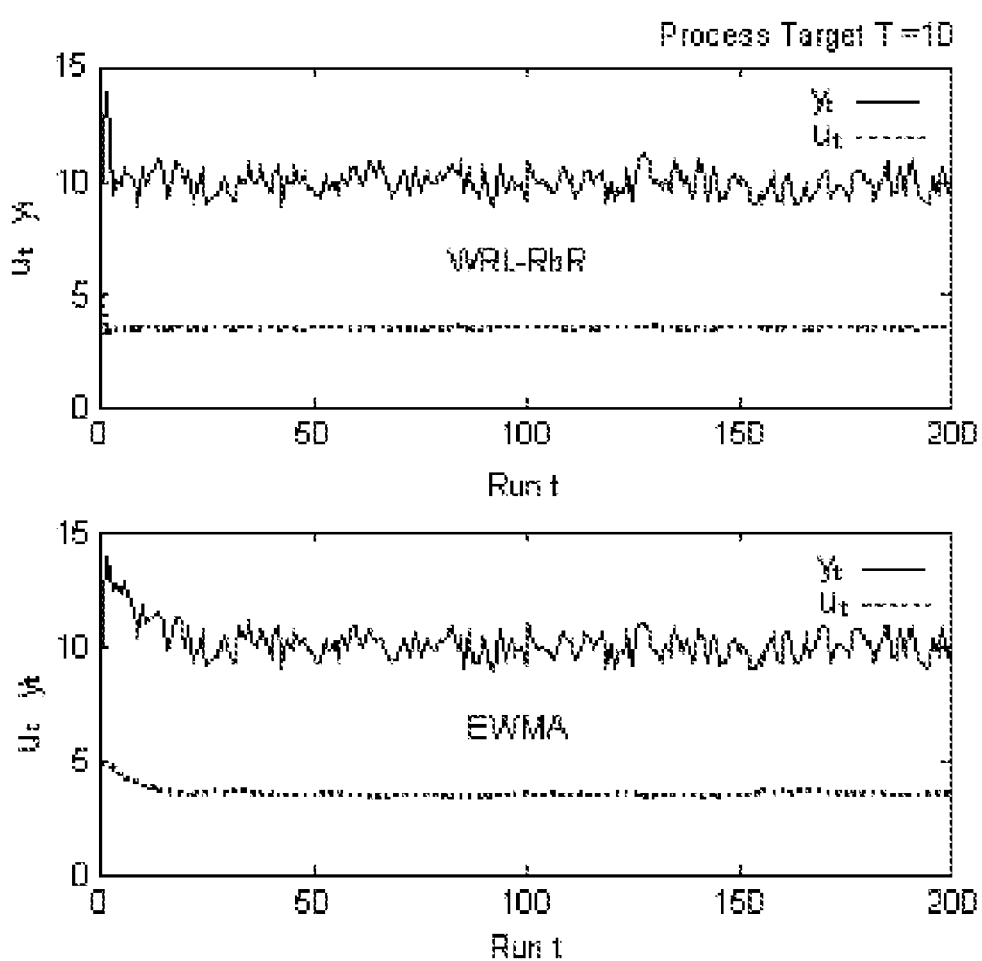
FIG. 4 is a pair of graphs illustrating the WRL-RbR controller (upper graph) and EWMA controller (lower graph) performance for a SISO process. Single-input-single-output (SISO) process with low autocorrelation, $\Phi = 0.1$.
Figure 5:
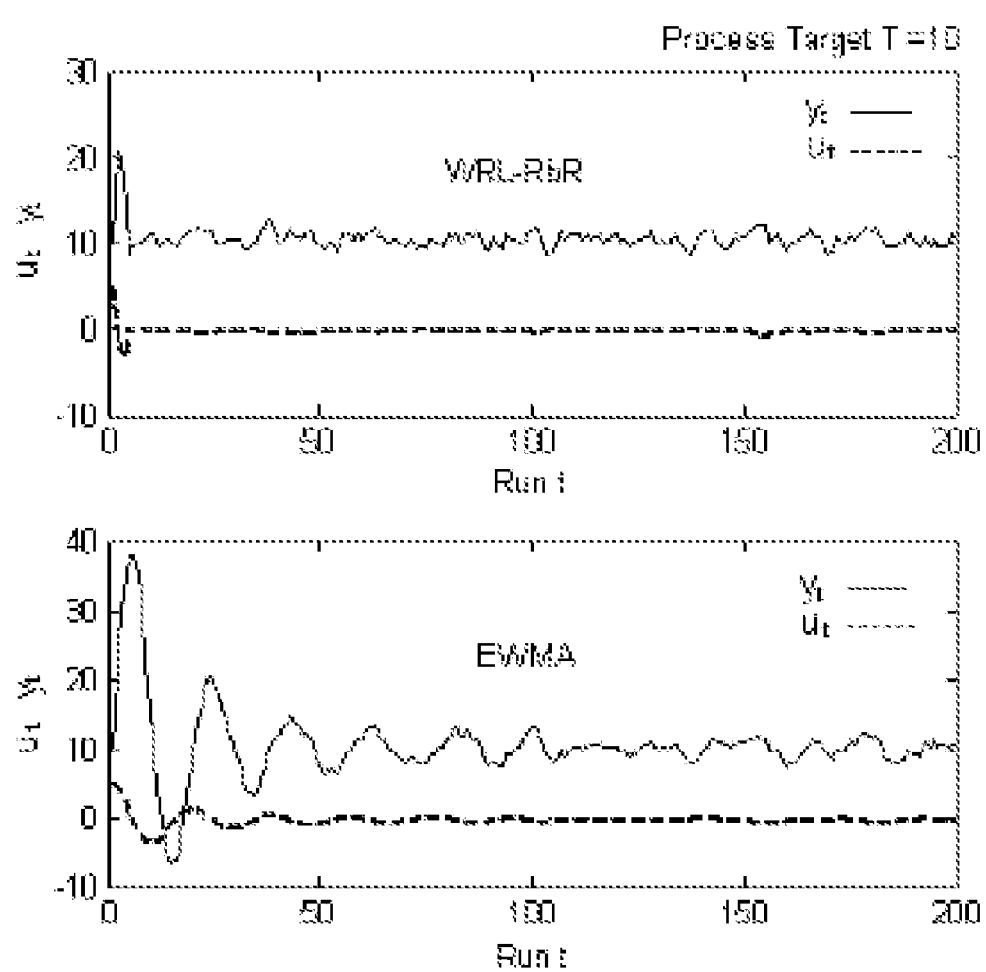
FIG. 5 is a pair of graphs illustrating the WRL-RbR controller (upper graph) and EWMA controller (lower graph) performance for a SISO process. SISO process with high autocorrelation, $\Phi = 0.9$.

FIGS. 4 and 5 show the initial performances of the strategies for an autocorrelation value of 0.1 and 0.9, respectively. As shown in FIG. 4, the initial bias in the WRL-RbR strategy is significantly reduced as shown. As depicted in FIG. 5, even under very high autocorrelation the RL based strategy performs very well. As for EWMA, it is well to perform poorly at high autocorrelations, which is evident from the figure.

A comparison of the mean square deviation (MSD) from target is presented in Table I. The MSD is calculated as follows.

$$MSD = \frac{\sum (y_t - T)^2}{n}, t = 0, 1, 2, 3, \ldots n, \quad (33)$$

where n is the total number of runs. The WRL-RbR strategy has the lowest MSD values for both levels of autocorrelation considered.

TABLE I

MEAN SQUARE DEVIATION FORM TARGET (SISO PROCESS)

| Autocorrelation | EWMA | WRL-RbR | % Decrease in MSD |
|---|---|---|---|
| 0.1 | 0.63 | 0.42 | 33 |
| 0.9 | 33.2 | 1.8 | 95 |

B. WRL-RbR Controller Performance for a MIMO Process

Figure 6:
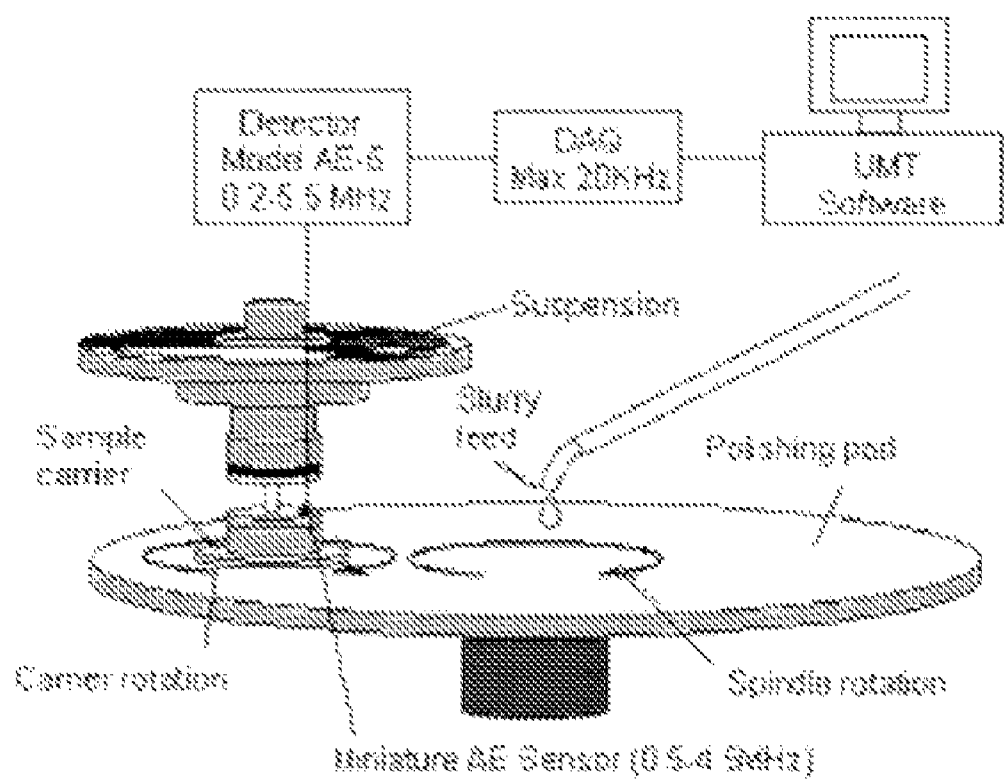
FIG. 6 is a schematic diagram of the CMP process.

The sample MIMO process adopted for study in this section is a CMP process, which is an essential step in semiconductor wafer fabrication [10], [11]. Wafer polishing that is accomplished using CMP is a nanoscale manufacturing process. The CMP task has been made more challenging in recent years due to the complex wafer topographies, and the introduction of copper (instead of aluminum) and low-k dielectrics. FIG. 6 shows the schematic of a CMP setup, which synergistically combines both tribological (abrasion) and chemical (etching) effects to achieve planarization.

1) CMP Modeling: As with any manufacturing operation, the CMP process falls victim to many known and unknown disturbances that affect its controlled operation. Variations among incoming wafers, process temperatures, polishing byproducts on the pad, mechanical tolerances caused by wear, and polishing consumables (slurry and pads) contribute to disturbances in the polishing process. Virtually all CMP processes, therefore, update polishing tool recipes either automatically or manually to compensate for such disturbances.

The CMP process used is a linear model consisting of two-output and four-input CMP process. The two outputs are the material removal rate ($Y_1$) and, within-wafer non-uniformity ($Y_2$). The four controllable inputs are: plate speed ($U_1$), back pressure ($U_2$), polishing downforce ($U_3$), and the profile of the conditioning system ($U_4$). The process equations are:

$$Y_1 = 1563.5 + 159.3(U_1) - 38.2(U_2) + 178.9(U_3) + 24.9(U_4) + \epsilon_1, \quad (34)$$

$$Y_2 = 254 + 32.6(U_1) + 113.2(U_2) + 32.6(U_3) + 37.1(U_4) + \epsilon_2, \quad (35)$$

where $\epsilon_1 \sim N(0, 60^2)$ and $\epsilon_2 \sim N(0, 30^2)$. The control equation in a matrix form for a MIMO system consisting of p outputs, m inputs (m>p) is $$U_t = (B'B + \mu I)^{-1} B'(T - A_t), \quad (36)$$

where B is the estimate of the true process gain η, I is a (p×p) identity matrix, μ>0 is a Lagrange multiplier (μ=0 for MIMO systems where m=p), T is a (p×1) vector of targets for the responses in Y, $A_t$ is the online estimates of the forecast offset γ obtained from the reward matrix. The parameter values used in the test are $$T = \begin{pmatrix} 2000 \\ 100 \end{pmatrix} = \text{target values for the responses } Y,$$

estimated gain $$B = \begin{pmatrix} 150 & -40 & 180 & 25 \\ 30 & 100 & 30 & 35 \end{pmatrix}, \mu = 0.001,$$

and forecast error values $$A_0 = \begin{pmatrix} 1600 \\ 250 \end{pmatrix}.$$

Figure 7:
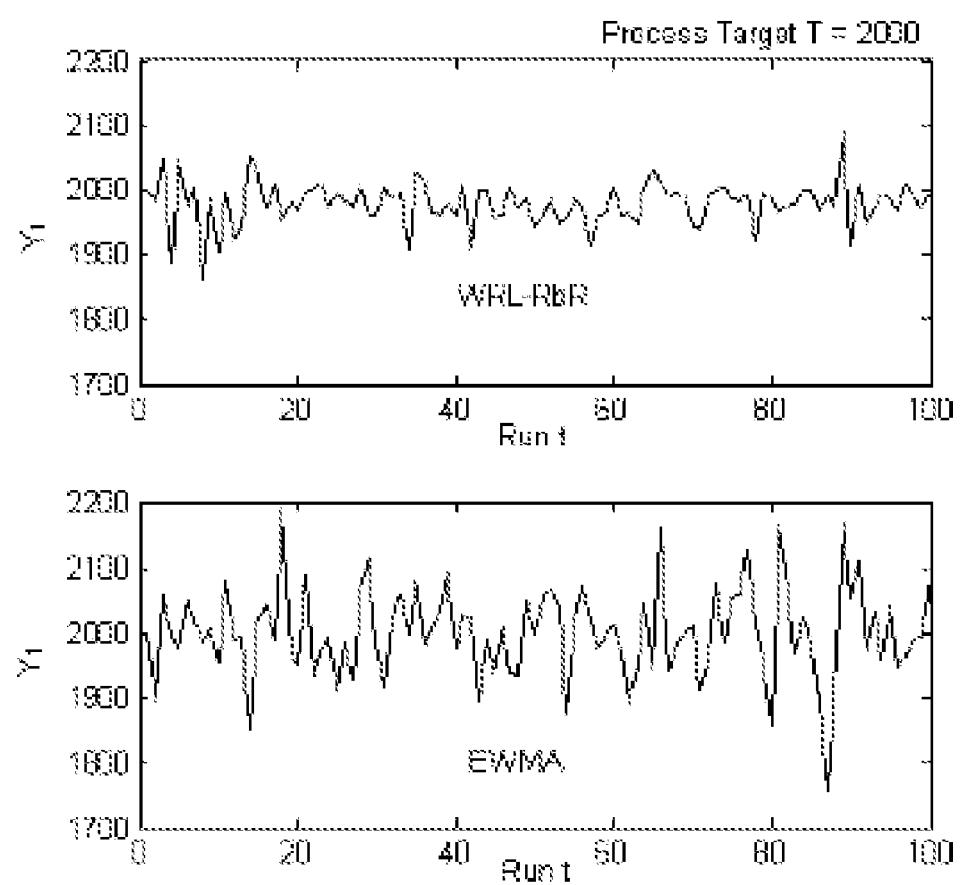
FIG. 7 is a pair of graphs illustrating the output $Y_1$ of a MIMO process for a WRL-RbR controller (upper graph) and EWMA controller (lower graph).
Figure 8:
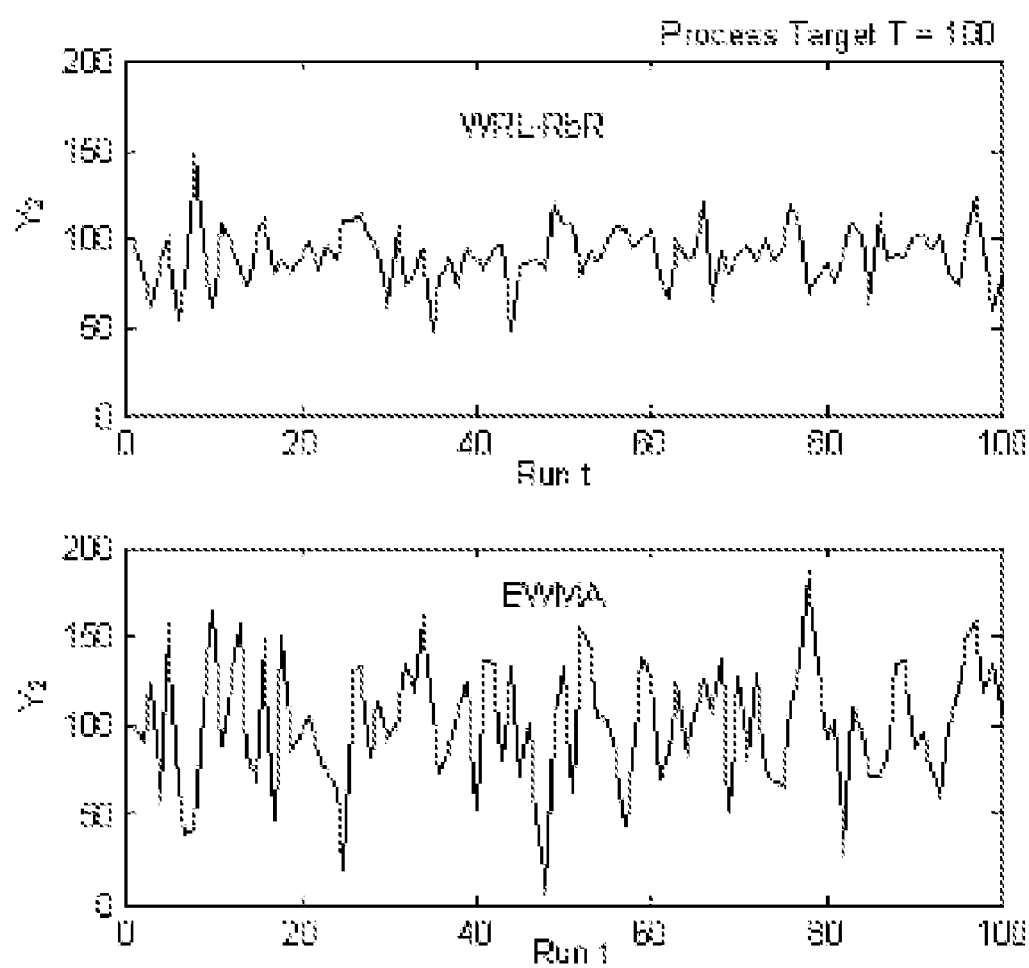
FIG. 8 is a pair of graphs illustrating the output $Y_2$ of a MIMO process for a WRL-RbR controller (upper graph) and EWMA controller (lower graph).

The above process was simulated using MATLAB for 100 runs and 50 replications. The error in both $Y_1$ and $Y_2$ were discretized into 21 states, each having a range of 10.0, starting at −100 until 100. Hence, the state space had ($21^2$) 441 states. The action space consisted of values from 0.5 to 1.5 in steps of 0.1 for $U_1$, −0.5 to −1.5 in steps of 0.1 for $U_2$, 0.85 to 1.85 in steps of 0.1 for $U_3$ and −0.55 to −0.05 in steps of 0.05 for $U_4$. This resulted in ($11^4$) 14641 possible actions for each state. Performance of both EWMA and RL strategies were compared. Similar to the SISO case, we chose the Daubechies fourth order wavelet and, the decomposition level up to four levels for the WRL-RbR strategies. Mean square deviation and standard deviation performances are shown in Table II and Table III for both types of controllers. FIGS. 7 and 8 show the output plots for $Y_1$ and $Y_2$ for both EWMA and WRL-RbR strategies. Clearly, performance of WRL-RbR is far superior to that of EWMA controller.

TABLE II

MEAN SQUARE DEVIATION FORM TARGET (MIMO PROCESS) (×$10^4$)

| Output | EWMA | WRL-RbR | % Decrease in MSD |
|---|---|---|---|
| $Y_1$ | 0.52 | 0.22 | 58 |
| $Y_2$ | 0.12 | 0.045 | 63 |

TABLE III

STANDARD DEVIATIONS (MIMO PROCESS)

| Output | EWMA | WRL-RbR | % Decrease in Std. Dev |
|---|---|---|---|
| $Y_1$ | 71.23 | 35.2 | 51 |
| $Y_2$ | 34.89 | 16.91 | 52 |

VIII. Learning Based Controller in a Model Free Environment

Figure 9:
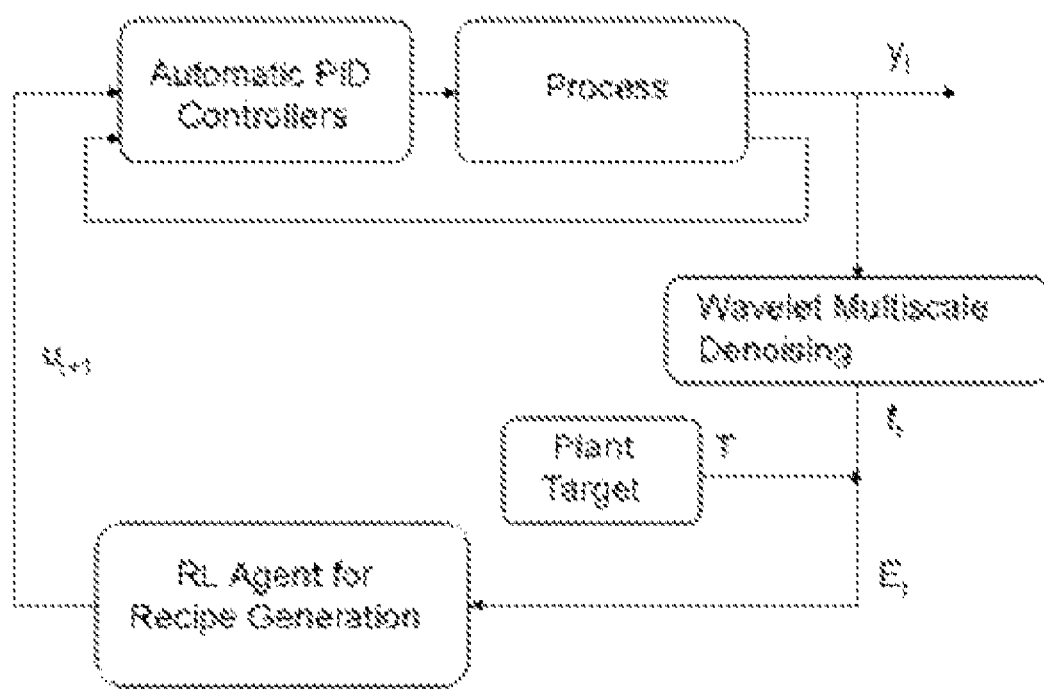
FIG. 9 is a schematic of a model free WRL-RbR controller.

A strategy is presented for extending the WRL-RbR controller to work in a model free environment, which is critical for systems requiring distributed sensing. Most real world systems are complex and large, and they seldom have models that accurately describe the relationship between output parameters and the controllable inputs. A conceptual framework of a model free RbR control is given in FIG. 9. The control laws are learnt through simulation and are continuously improved during real time implementation. The unique advantage of model free approaches is the ability to factor into the study many other parameters some of which could be nonstationary, for which it is very difficult to develop a mathematical model. The application of model free WRL-RbR control in a CMP process which could serve as a test bed for a distributed sensing application is provided.

A. Design of a Controller for Distributed Sensing

The CMP process is influenced by various factors such as plate speed, back pressure, polishing downforce, the profile of the conditioning system, slurry properties (abrasive concentration, and size), incoming wafer thickness, pattern density of circuits, and dynamic wear of the polishing pad. Several outputs that are monitored are the material removal rate, within-wafer non-uniformity, between wafer non-uniformity, acoustic emission (AE), coefficient of friction (CoF), and thickness of the wafer. Ideally, one would monitor all the above inputs and outputs via distributed sensors. However, due to lack of accurate process models that link the outputs to the controllable inputs, and also due to speed of execution issues, simple linear models are often used. A model free learning approach would make it viable to control the CMP process using the above parameters. The wavelet analysis also provides a means of using nonstationary signals like the AE and CoF in control. This is due to the fact that wavelet analysis produces detail coefficients that are stationary surrogates of nonstationary signals. Also the pattern recognition feature of wavelet can be used to obtain information on trend/shift/variance of the process, which can be used by the RL controller to provide accurate compensation. Our research in WRL-RbR controllers for a large scale distributed environment is on going and results have shown unprecedented potential to extend this technology to other distributed systems. The results presented serve as a proof of concept for the new breed of learning based WRL-RbR strategy.

IX. Conclusions

RbR controllers have been applied to processes where online parameter estimation and control are necessary due to the short and repetitive nature of those processes. Presented is a novel control strategy, which has high potential in controlling many process applications. The control problem is cast in the framework of probabilistic dynamic decision making problems for which the solution strategy is built on the mathematical foundations of multiresolution analysis, dynamic programming, and machine learning. The strategy was tested on problems that were studied before using the EWMA strategy for autocorrelated SISO and MIMO systems, and the results obtained were compared with them. It is observed that RL based strategy outperforms the EWMA based strategies by providing better convergence and stability in terms of lower error variances, and lower initial bias for a wide range of autocorrelation values. The wavelet filtering of the process output enhances the quality of the data through denoising and results in extraction of the significant features of the data on which the controllers take action. Further research is underway in developing other WRL-RbR control strategies, which incorporates wavelet based analysis to detect drifts and sudden shifts in the process, and scale up the controller for large scale distributed sensing environments with hierarchical structures.

REFERENCES

[1] A. Ingolfsson and E. Sachs, "Stability and sensitivity of an ewma controller," *Journal of Quality Technology*, vol. 25, no. 4, pp. 271-287, 1993.

[2] B. Del Castillo and J. Yeh, "An adaptive optimizing quality controller for linear and nonlinear semiconductor processes," *IEEE Transactions on Semiconductor Manufacturing*, vol. 11, no. 2, pp. 285-295, 1998.

[3] W. J. Campbell, "Model predictive run-to-run control of chemical mechanical planarization" Ph.D. dissertation, University of Texas at Austin, 1999.

[4] Z. Ning, J. R. Moyne, T. Smith, D. Boning, B. D. Castillo, J. Y. Yeh, and A. Hurwitz, "A comparative analysis of run-to-run control algorithms in the semiconductor manufacturing industry." in *Proceedings of the Advanced Semiconductor Manufacturing*. IEEE/SEMI, 1996, pp. 375-381.

[5] K. Chamness, G. Cherry, R. Good, and S. J. Qin, "Comparison of r2r control algorithms for the cmp with measurement delays." in *Proceedings of the AEC/APC XIII Symposium.*, Banff, Canada, 2001.

[6] E. Sachs, A. Hu, and A. Ingolfsson, "Run by run process control: Combining spc and feedback control," *IEEE Trans. Semiconduct. Manufact.*, vol. 8, pp. 26-43, 1995.

[7] S. W. Butler and J. A. Stefani, "Supervisory run-to-run control of a polysilicon gate etch using in situ ellipsometry," *IEEE Trans. on Semiconduc. Manufact.*, vol. 7, pp. 193-201, 1994.

[8] E. Del Castillo and A. M. Hurwitz, "Run-to-run process control: Literature review and extensions," *Journal of Quality Technology*, vol. 29, no. 2, pp. 184-196, 1997.

[9] T. H. Smith and D. S. Boning, "Artificial neural network exponentially weighted moving average control for semiconductor processes," *J. Vac. Sci. Technol. A*, vol. 15, no. 3, pp. 1377-1384, 1997.

[10] E. Del Castillo and R. Rajagopal, "A multivariate double ewma process adjustment scheme for drifting processes," *IIE Transactions*, vol. 34, no. 12, pp. 1055-1068, 2002.

[11] R. Rajagopal and B. Del Castillo, "An analysis and mimo extension of a double ewma run-to-run controller for non-squared systems:' *International Journal of Reliability, Quality and Safety Engineering*, vol. 10, no. 4, pp. 417-428, 2003.

[12] S. K. S. Fan, B. C. Jiang, C. H. Jen, and C. C. Wang, "SISO run-to-run feedback controller using triple EWMA smoothing foe semiconductor manufacturing processes," *Intl. J. Prod. Res.*, vol. 40, no. 13, pp. 3093-3120, 2002.

[13] S. T. Tseng, A. B. Yeh, F. Tsung, and Y. Y. Chan, "A study of variable EWMA controller," *IEEE Transactions on Semiconductor Manufacturing*, vol. 16, no. 4, pp. 633-643, 2003.

[14] N. S. Patel and S. T. Jenkins, "Adaptive optimization of run-by-run controllers," *IEEE Transactions on Semiconductor Engineering*, vol. 13, no. 1, pp. 97-107, 2000.

[15] C. T. Su and C. C. Hsu, "On-line tuning of a single ewma controller based on the neural technique," *Intl. J of Prod. Res.*, vol. 42, no. I 1, pp. 2163-2178, 2004.

[16] D. Shi and F. Tsung, "Modeling and diagnosis of feedback-controlled process using dynamic PCA and neural networks," *Intl. J. of Prod. Res.*, vol. 41, no. 2, pp. 365-379, 2003.

[17] E. Del Castillo, "Long run transient analysis of a double EWMA feedback controller," *IIE Transactions*, vol. 31, pp. 1157-1169, 1999.

[18] R. Ganesan, T. K. Das, and V. Venkataraman, "Wavelet based multiscale statistical process monitoring—A literature review," *IIE Transactions on Quality and Reliability Engineering*, vol. 36, no. 9, pp. 787-806, 2004.

[19] A. Terchi and Y. H. J. Au, "Acoustic emission signal processing:' *Measurement and Control*, vol. 34, pp. 240-244, 2001.

[20] I. N. Tansel, C. Mekdesi, O. Rodriguez, and B. Uragun, "Monitoring microdrilling operations with wavelets," *Quality Assurance Through Integration of Manufacturing Processes and Systems—ASME*, pp. 151-163, 1992.

[21] X. Li, "A brief review: Acoustic emission method for tool wear monitoring during turning," *International Journal of Machine Tools and Manufacture*, vol. 42, pp. 157-165, 2002.

[22] G. Strang and T. Nguyen, *Wavelets and Filter Banks*. Wellesley MA: Wellesley Cambridge Press, 1996.

[23] I. Daubechies, *Ten Lectures in Wavelets*. Philadelphia: SIAM, 1992.

[24] D. L. Donoho, I. M. Johnstone, G. Kerkyacharian, and D. Picard, "Wavelet shrinkage: Asymptopia? (with discussion)," *Journal of the Royal Statistical Society*, vol. 57, no. 2, pp. 301-369, 1995.

[25] F. Abramovich and Y. Benjamini, "Thresholding of wavelet coefficients as multiple hypothesis testing procedure:' in *Wavelets and Statistics*, ser. Lecture Notes in Statistics, A. Antoniadis and G. Oppenheim, Eds. New York: Springer-Verlag, 1995, vol. 103, pp. 5-14.

[26] M. Neumann and R. V. Sachs, "Wavelet thresholding: Beyond the Gaussian iid situation," in *Wavelets and Statistics*, ser. Lecture Notes in Statistics, A. Antoniadis and G. Oppenheim, Eds. New York: Springer-Verlag, 1995, vol. 103, pp. 301-329.

[27] A. J. Toprac, H. Luna, B. Withers, M. Bedrin, and S. Toy, "Developing and implementing an advanced cmp run-to-run controller," *Micromagazine*, 2003, available URL: http://www.micromagazine.comlarchive/03/08/toprac.html.

[28] R. Bellman, "The theory of dynamic programming," *Bull. Amer. Math. Soc.*, vol. 60, pp. 503-516, 1954.

[29] H. Robbins and S. Monro, "A stochastic approximation method," *Ann. Math. Statist.*, vol. 22, pp. 400-407, 1951.

[30] M. L. Puterman, in *Markov Decision Processes*. Wiley Interscience, New York, 1994.

[31] J. Abounadi, "Stochastic approximation for non-expansive maps: Application to q-learning algorithms," Ph.D. dissertation, MIT, MA, February 1998.

[32] A. Gosavi, "An algorithm for solving semi-markov decision problem using reinforcement learning: Convergence analysis and numerical results," Ph.D. dissertation, 1998, IMSE Dept., University of South Florida, Tampa, Fla.

[33] J. Bremer, R. Coifinan, M. Maggioni, and A. Szlam, "Diffusion wavelet packets," Yale University, Tech. Rep. YALE/DCS/TR-1 304, 2004, to appear in Appl. Comp. Harm. Anal.

[34] S. Mahadevan and M. Maggioni, "Value function approximation using diffusion wavelets and laplacian eigenfunctions," University of Massachusetts, Department of Computer Science, Technical Report TR 2005-38 2005.

[35] R. Coifinan and M. Maggioni, "Diffusion wavelets," Yale University, Tech. Rep. YALEIDCS/TR-1303, 2004, to appear in Appi. Comp. Harm. Anal.

[36] R. Ganesan, T. K. Das, A. K. Sikder, and A. Kumar, "Wavelet based identification of delamination of low-k dielectric layers in a copper damascene CMP process," *IEEE Transactions on Semiconductor Manufacturing*, vol. 16, no. 4, pp. 677-685, 2003.

[37] B. R. Bakshi, "Multiscale statistical process control and model-based denoising," in *Wavelets in Chemistry*, ser. Data Handling in Science and Technology, B. Walczak, Ed. P.O. Box 211, 1000 AE Amsterdam, Netherlands: Elsevier, 2000, vol. 22, ch. 17, pp. 411-436.

[38] V. S. Borkar, "Stochastic approximation with two-time scales," *System and Control Letters*, vol. 29, pp. 291-294, 1997.

[39] A. Gosavi, "European journal of operational research," *Reinforcement Learning for Long-Run Average Cost*, vol. 155, pp. 654-674, 2004.

[40] V. S. Borkar and K. Soumyanath, "An analog scheme for fixed point computation, part I: Theory," *IEEE Transactions on Circuits and Systems I. Fundamental Theory and Applications*, vol. 44, pp. 351-354, 1997.

[41] D. Bertsekas and J. Tsitsiklis, in *Neuro-Dynamic Programming*. Athena Scientific, Belmont, Mass., 1995.

The disclosure of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of performing wavelet-modulated reinforcement learning-based run-by-run control to control output variability in a manufacturing process run, comprising the steps of:

receiving process output signal ($y_t$) for a run t;

modulating the process output signal ($y_t$) to generate a wavelet reconstructed signal ($f_t$);

generating a predicted model output ($\hat{y}_t$) for the run t using a control recipe ($u_t$);

calculating a process deviation ($E_t$) by taking the difference between the wavelet reconstructed signal ($f_t$) and the predicted model output ($\hat{y}_t$);

predicting a reinforcement learning-based offset ($a_t$) using the process deviation ($E_t$); and generating a next control recipe ($u_{t+1}$) using the reinforcement learning-based offset ($a_t$), wherein the next control recipe ($u_{t+1}$) is used to predict the next process output at run t+1 and as a set-point for a PID controller for the next run t+1.

2. A wavelet-modulated reinforcement learning-based run-by-run controller for use in a control loop having a manufacturing process under control and a PD controller, wherein the PID controller has a PID controller output for providing a control signal and a PID controller input for receiving a control recipe ($u_t$), and the manufacturing process under control has a process input coupled to the PID controller output to receive the control signal, and a process output for providing a process output signal ($y_t$), the run-by-run controller comprising:

a wavelet modulator having a modulator input coupled to the process output to receive the process output signal ($y_t$) and a modulator output providing a wavelet reconstructed signal ($f_t$) based on the process output signal ($y_t$) for a run t;

a process model having a model input to receive the control recipe ($u_t$) and a model output providing a predicted model output ($\hat{y}$) based on the control recipe ($u_t$);

a process deviation module having a first deviation module input coupled to the modulator output to receive the wavelet reconstructed signal ($f_t$), a second deviation module input coupled to the model output to receive the predicted model output ($\hat{y}_t$), and a deviation module output providing a process deviation ($E_t$), said process deviation calculated according to the formula $E_t=|f_t-\hat{y}_t|$;

a reinforced learning-based error predictor having a predictor input coupled to the deviation module output to receive the process deviation ($E_t$) and a predictor output providing an offset prediction ($a_t$) based on the process deviation ($E_t$); and a recipe generator having a generator input coupled to the predictor output to receive the offset prediction ($a_t$) and a generator output coupled to the model input and the PID controller input, wherein the recipe generator produces a next control recipe ($u_{t+1}$) based on the offset prediction ($a_t$).

* * * * *